(12) United States Patent
Kouzel

(10) Patent No.: US 10,378,536 B2
(45) Date of Patent: Aug. 13, 2019

(54) AIR COMPRESSOR DISCHARGE SYSTEM

(71) Applicant: CLARK EQUIPMENT COMPANY, Statesville, NC (US)

(72) Inventor: Richard Kouzel, Mooresville, NC (US)

(73) Assignee: CLARK EQUIPMENT COMPANY, Statesville, NC (US)

( * ) Notice: Subject to any disclaimer, the term of this patent is extended or adjusted under 35 U.S.C. 154(b) by 559 days.

(21) Appl. No.: 14/303,857

(22) Filed: Jun. 13, 2014

(65) Prior Publication Data

US 2015/0361975 A1    Dec. 17, 2015

(51) Int. Cl.
*F16K 11/07*    (2006.01)
*F04C 28/24*    (2006.01)
(Continued)

(52) U.S. Cl.
CPC ............ *F04B 49/225* (2013.01); *F04B 41/00* (2013.01); *F04B 49/08* (2013.01); *F04C 28/24* (2013.01);
(Continued)

(58) Field of Classification Search
CPC ........ F04B 49/225; F04B 39/16; F04B 41/00; F04B 49/08; F04C 28/24; F04C 28/06;
(Continued)

(56) References Cited

U.S. PATENT DOCUMENTS 2,081,542 A * 5/1937 Kidney ................. E21B 43/017
                                                  137/456
3,785,755 A * 1/1974 Novak ................. F04C 29/0007
                                                   418/85
(Continued)

FOREIGN PATENT DOCUMENTS

CN    20044801    11/2011
DE    2933084    3/1981
(Continued)

OTHER PUBLICATIONS

International Search Report for Application No. PCT/US2015/035886 dated Sep. 1, 2015 (3 pages).
(Continued)

*Primary Examiner* — Nathan C Zollinger
(74) *Attorney, Agent, or Firm* — Michael Best & Friedrich LLP

(57) ABSTRACT

A compressor discharge system, operable to output a flow of compressed air to a service line at a system pressure, includes a compressor operable to produce a flow of compressed air at a discharge pressure. The system also includes a filter positioned downstream of the compressor and operable to receive the flow of compressed air at about the discharge pressure and discharge the flow of compressed air at a filter pressure. The system also includes a control assembly including an actuator and a variable sized orifice movable between a first, open position and a second, restricted position, the variable orifice positioned to receive the flow of compressed air at about the filter pressure and to discharge the flow of compressed air at the system pressure. The actuator is operable in response to pressure feedback in the customer service line to move the orifice to the restricted position.

10 Claims, 3 Drawing Sheets

(51) Int. Cl.
  *F04B 49/22* (2006.01)
  *F04B 49/08* (2006.01)
  *F04B 41/00* (2006.01)
  *F04B 39/16* (2006.01)

(52) U.S. Cl.
  CPC ............... *F04B 39/16* (2013.01); *F16K 11/07* (2013.01); *Y10T 137/7761* (2015.04)

(58) Field of Classification Search
  CPC ......... B60G 17/0523; Y10T 137/87225; Y10T 137/8671; F16K 11/07
  See application file for complete search history.

(56) References Cited

U.S. PATENT DOCUMENTS

| | | | | |
|---|---|---|---|---|
| 3,792,714 | A | * | 2/1974 | Miller ................... F15B 11/068 137/462 |
| 4,361,417 | A | | 11/1982 | Suzuki |
| 4,406,598 | A | | 9/1983 | Walling |
| 4,770,153 | A | * | 9/1988 | Edelman ................. F41B 11/51 124/72 |
| 7,225,830 | B1 | * | 6/2007 | Kershaw ................. F16K 17/06 137/512.1 |
| 7,503,409 | B2 | * | 3/2009 | Brookover .............. E21B 21/08 173/3 |
| 2004/0191078 | A1 | | 9/2004 | Yoshihiro et al. |
| 2004/0247469 | A1 | | 12/2004 | Fassbender et al. |
| 2012/0263605 | A1 | * | 10/2012 | DeMore .................. F04D 17/12 417/2 |

FOREIGN PATENT DOCUMENTS

| | | | | |
|---|---|---|---|---|
| GB | 853243 | A | * 11/1960 | ............. H01H 33/32 |
| JP | H0396668 | | 4/1991 | |
| JP | 2006283649 | | 10/2006 | |
| WO | 2009149803 | | 12/2009 | |

OTHER PUBLICATIONS

Written Opinion for Application No. PCT/US2015/035886 dated Sep. 1, 2015 (9 pages).

European Patent Office Search Report for Application No. 15806019.4 dated Jan. 10, 2018, 10 pages.

* cited by examiner

AIR COMPRESSOR DISCHARGE SYSTEM

BACKGROUND

The present invention relates to a compressor discharge system for managing a flow of compressed fluid (e.g., air) exiting an air compressor.

Air compressor discharge systems are used in a variety of applications, including natural gas and oil exploration, where customers require a service line to be connected to a source of compressed air so that the customers may use the compressed air as needed. These systems typically include an air compressor, along with components such as a separator tank and various other separator elements and lines that connect the air compressor to the customer service line.

During use, the air compressor is often exposed to downstream pressure fluctuations, whereby the customer service line pressure may drop from a normal operating pressure to a very low or zero operating pressure in a short amount of time. These rapid pressure fluctuations evacuate components of the air compressor discharge system of compressed air faster than the air compressor can replenish it, thus creating an instantaneously large pressure differential across components of the air compressor discharge system. These large pressure differentials can have an adverse effect on components within the air compressor discharge system. For example, some separator elements are known to fail or collapse at about a 50 psi pressure differential.

SUMMARY

In accordance with one construction, a compressor discharge system, operable to output a flow of compressed air to a service line at a system pressure, includes a compressor operable to produce a flow of compressed air at a discharge pressure. The system also includes a filter positioned downstream of the compressor and operable to receive the flow of compressed air at about the discharge pressure and discharge the flow of compressed air at a filter pressure. The system also includes a control assembly including an actuator and a variable sized orifice movable between a first, open position and a second, restricted position, the variable orifice positioned to receive the flow of compressed air at about the filter pressure and to discharge the flow of compressed air at the system pressure. The actuator is operable in response to pressure feedback in the customer service line to move the orifice to the restricted position.

In accordance with another construction, a method of controlling compressed air flow from an air compressor to a customer service line includes directing a flow of compressed air from an air compressor, through a filter, through a control assembly, and to a customer service line. The method also includes detecting that the customer service line is experiencing a discharge rate that exceeds a rate of supply air from the air compressor, and moving a variable size orifice within the control assembly from an open position to a restricted position in response to detection of the customer service line experiencing a discharge rate that exceeds a rate of supply air from the air compressor.

In accordance with another construction, a compressor system operable to discharge a flow of compressed gas to a service line, the service line having a service pressure, includes a variable speed compressor operable at a normal speed to produce a flow of compressed air at a first pressure. The system also includes a filter positioned to receive the flow of compressed air at the first pressure and to discharge the flow of compressed air at a second pressure, the difference between the first pressure and the second pressure defining a filter pressure differential. The system also includes a variable orifice positioned to receive the flow of compressed air at the second pressure and to discharge the flow of compressed air at the system pressure, the difference between the second pressure and the system pressure defining an orifice pressure differential. The system also includes a sensor positioned to measure the system pressure. The system also includes an actuator operable in response to the measured system pressure to move the orifice from a first position in which the filter pressure differential is a first value and the orifice pressure differential is second value to a second position in which the filter pressure differential is a third value and the orifice pressure differential is fourth value, wherein the first value is about equal to the third value, and wherein the second value is smaller than the fourth value.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
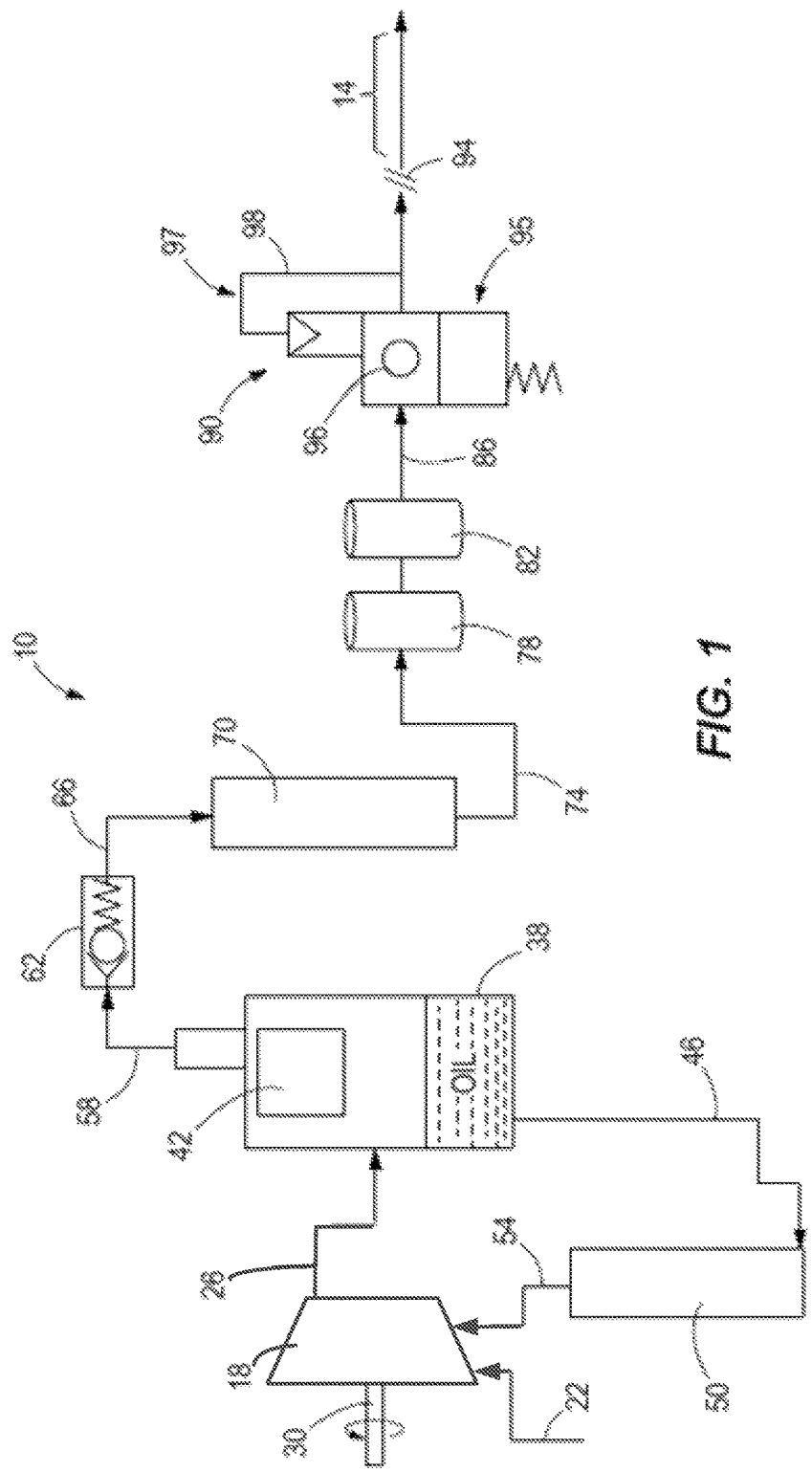
FIG. 1 is a schematic illustration of an air compressor discharge system according to one construction.

FIG. 1 illustrates an air compressor discharge system 10 for generating and discharging airflow, or another compressed gas, to a customer service line 14 (e.g., a hose). The system 10 includes an air compressor 18 (preferably variable speed) coupled to an inlet 22 for receiving air into the air compressor 18. The air compressor 18 is coupled to an outlet 26 for directing compressed air out of the air compressor 18. The air compressor 18 is driven by a prime mover 30 such as an engine or electric motor.

In the illustrated construction, the compressor 18 is an oil-flooded compressor such as an oil-flooded screw compressor. The oil flows between rotating screws of the compressor to lubricate the components and to enhance the seal between the components. Some of the oil inevitably mixes with the compressed air and is discharged from the outlet 26 as a mixed air-oil flow. Of course, non-oil-flooded or other types of compressors could also be used with the invention.

With continued reference to FIG. 1, the system 10 includes a separator tank 38 that is coupled to the outlet 26. Compressed air from the air compressor 18 is passed from the air compressor 18 through the outlet 26 to the separator tank 38. The separator tank 38 may perform a mechanical separation step to separate some of the oil from the air-oil mixture. In addition, the separator tank 38 includes a separator element 42 (e.g., a filter) that separates additional oil from the air-oil stream that has passed through the outlet 26 and into the separator tank 38.

The system 10 also includes an outlet 46 coupled to the separator tank 38 and to an oil cooler 50. Oil is passed from the separator tank 38 through the outlet 46 to the oil cooler 50, where the oil is cooled.

The system 10 also includes an outlet 54 coupled to both the oil cooler 50 and the air compressor 18. Cooled oil is passed from the oil cooler 50 through the outlet 54 to the air compressor 18, where the cooled oil facilitates operation of the air compressor 18.

With continued reference to FIG. 1, the system 10 also includes an outlet 58 coupled to both the separator tank 38 and to a minimum pressure check valve 62. Air passes from the oil separator tank 38 through the outlet 58 to the check valve 62. The check valve 62 is normally closed, and is biased toward a closed position with a spring or other biasing element. The check valve 62 only opens when the pressure of the compressed air passing through the outlet 58 (in the direction illustrated by the arrow in FIG. 1) is large enough to overcome the force of the spring or other biasing element. The check valve 62 inhibits or prevents air or other material from reversing its flow direction and entering the separator tank 38, oil cooler 50, and air compressor 18 from the downstream side of the system. Of course, the check valve 62 could be positioned at other points within the flow path if desired.

With continued reference to FIG. 1, the system 10 also includes an outlet 66 coupled to the check valve 62 and to an aftercooler 70. Substantially oil-free compressed air is passed from the separator tank 38 through the outlet 58, the check valve 62, and the outlet 66 to the aftercooler 70. The aftercooler 70 is a heat exchanger that cools and removes heat produced during compression from the air. As the air cools, it approaches its dew point and moisture begins to condense out of the air. In some constructions the system 10 does not include the aftercooler 70.

With continued reference to FIG. 1, the system 10 also includes an outlet 74 coupled to the aftercooler 70 and to a water separator 78. Air is passed from the aftercooler 70 through the outlet 74 to the water separator 78. The water separator 78 is coupled to an oil removal filter 82. The water separator 78 and the oil removal filter 82 remove water and oil from the air, respectively. In the illustrated construction air passes through the water separator 78 prior to passing through the oil removal filter 82. In other constructions air passes through the oil removal filter 82 prior to passing through the water separator 78. In still other constructions, the additional oil removal filter 82 is omitted or positioned upstream of the aftercooler 70.

With continued reference to FIG. 1, the system 10 includes an outlet 86 coupled to the oil removal filter 82 and to a control assembly 90. Air is passed from the oil removal filter 82 through the outlet 86 to the control assembly 90. The control assembly 90 is configured to control pressure drops (i.e. pressure differentials) across components in the system 10. The control assembly 90 is coupled to a customer connection point 94 (e.g., a hose connector or other structure) that is coupled to the customer service line 14, such that compressed air is able to pass from the air compressor 18 to the customer service line 14 when the customer service line 14 is coupled to the connection point 94.

In general, air compressor systems of the type described herein operate to deliver a quantity of compressed air at a desired pressure, and at a desired rate (i.e., quantity of compressed air per unit of time), to a point of use. During operation, the compressed air leaves the air compressor 18 at a discharge pressure, as dictated by downstream restrictions, and is used at a point of use at a second pressure. Various components such as pipes, valves, filters, etc. produce pressure drops between the air compressor 18 and the point of use. Thus, the second pressure is always less than the air compressor 18 discharge pressure. During periods of large compressed air use, it is possible for the air to be used faster than the air compressor 18 can replenish the supply. During these periods, it is possible for the second pressure to be reduced even further than when compared to the second pressure during normal operation. This total pressure drop must be accommodated by the various components between the air compressor 18 and the point of use. If the total pressure drop is too large, some of these components can be damaged by the larger than normal pressure drop to which they are exposed.

With continued reference to FIG. 1, during normal operating conditions, a discharge pressure at the air compressor 18 is greater than an air pressure in the customer service line 14, such that a normal total pressure drop (i.e., a normal total pressure differential) $\Delta P_{total,\ normal}$ across the system 10 exists between the air compressor 18 and the customer service line 14, pushing air through the system 10 from the air compressor 18 to the customer service line 14. This normal total pressure drop $\Delta P_{total,\ normal}$ is divided amongst the components in the system 10, such that each of the components (e.g., the separator element 42, the control assembly 90, etc.) has its own normal component pressure drop $\Delta P_{component,\ normal}$. The sum of the normal component pressure drops $\Delta P_{component,\ normal}$ equals the normal total pressure drop $\Delta P_{total,\ normal}$ across the system 10. Each component's normal component pressure drop $\Delta P_{component,\ normal}$ may be different than another component's normal component pressure drop $\Delta P_{component,\ normal}$ depending on flow restrictions of flow path variations within the particular component.

In the illustrated construction, the separator element 42 is a filter that receives a flow of air from the air compressor 18 at about the discharge pressure from the air compressor 18, and discharges the flow of air at a filter pressure. The normal component pressure drop $\Delta P_{component,\ normal}$ across the separator element 42 is the difference between the received discharge pressure and the filter pressure.

In the illustrated construction, the control assembly 90 receives a flow of air from the separator element 42 at about the filter pressure, and discharges the air at the air pressure in the customer service line 14. The normal component pressure drop $\Delta P_{component,\ normal}$ across the control assembly 90 is the difference between the filter pressure and the pressure in the customer service line 14.

As described above, air compressors such as the air compressor 18 are often exposed to pressure fluctuations, whereby the air pressure in the customer service line 14 (downstream of the control assembly 90) drops from its normal operating pressure to a very low or zero pressure in a short amount of time. This can occur for several reasons, including a use of compressed air in the customer service line 14 that exceeds the rate at which the air compressor 18 can provide the air.

This excess use causes a rapid pressure drop in the customer service line 14 that propagates upstream along the system 10 toward the air compressor 18, generating a new total pressure drop $\Delta P_{total,\ new}$ (i.e., a new total pressure differential) across the system 10 between the air compressor 18 and the customer service line 14. This new total pressure drop $\Delta P_{total,\ new}$ is greater than the normal total pressure drop $\Delta P_{total,\ normal}$ described above.

As with the normal total pressure drop $\Delta P_{total,\ normal}$, this new total pressure drop $\Delta P_{total,\ new}$ is also divided amongst the components in the system 10, such that each of the components (e.g., the separator element 42, the control assembly 90, etc.) has its own new component pressure drop $\Delta P_{component,\ new}$. The sum of the new component pressure drops $\Delta P_{component,\ new}$ is equivalent to the new total pressure drop $\Delta P_{total,\ new}$ across the system 10. Each component's new component pressure drop $\Delta P_{component,\ new}$ may be different than another component's new component pressure drop $\Delta P_{component,\ new}$.

As the new total pressure drop $\Delta P_{total,\ new}$, generated by the excess use initially propagates upstream from the customer service line 14, it reaches the downstream end of a first one of the components, generating the new component pressure drop $\Delta P_{component,\ new}$ across that component. What remains of the new total pressure drop $\Delta P_{total,\ new}$ then moves on to the next upstream component, generating the new component pressure drop $\Delta P_{component,\ new}$ across that next component, and so on, until each of the components in the system 10 has acquired its new component pressure drop $\Delta P_{component,\ new}$.

Some components of the system 10 are only capable of accommodating a new component pressure drop $\Delta P_{component,\ new}$ of a certain value. Exceeding this value can result in a failure of the component. If the pressure drop produced by the excess use reaches the downstream side of one of these components before the air compressor 18 discharge pressure is reduced, component failure can occur.

The control assembly 90 monitors the pressure fluctuations in the customer service line 14, and depending on the magnitude, and especially the rate, of the pressure fluctuations, adjusts the new component pressure drop $\Delta P_{component,\ new}$ across the control assembly 90 to increase the new component pressure drop $\Delta P_{component,\ new}$ across the control assembly 90 and lower the new component pressure drops $\Delta P_{component,\ new}$ across the other, more sensitive components (e.g., the separator element 42) upstream of the control assembly 90.

With reference to FIG. 1, the control assembly 90 includes a spring-loaded, two-position, spool-type valve 95 machined from steel, aluminum, cast iron, brass, bronze, or other alloy or material of sufficient strength and suited to the particular fluid being compressed. Other constructions include different types of valves.

The valve 95 includes a variable size orifice 96 that is configured to be reduced in size when the customer service line 14 experiences a discharge rate that exceeds the rate of supply air from the air compressor 18 or if the pressure within the service line drops below a threshold level that results in an excessive pressure drop across various system components. When the orifice is reduced in size, the orifice 96 produces a larger new component pressure drop $\Delta P_{component,\ new}$ (i.e., a larger new orifice pressure differential) across the control assembly 90 than would be produced by a larger orifice 96, such that the pressure upstream of the orifice 96 remains sufficiently high, and the new component pressure drops $\Delta P_{component,\ new}$ across the upstream components remain sufficiently small to prevent damage to those components. The orifice 96 operates in a first, open position having a first diameter when the pressure in the customer service line 14 is normal (i.e., when the total pressure drop across the system 10 is still $\Delta P_{total,\ normal}$). The orifice 96 is activated to move to a second, restricted position having the reduced diameter when the customer service line 14 experiences a discharge rate that exceeds the rate of supply air from the air compressor 18 or the pressure in the customer service line 14 drops below the threshold pressure (i.e., when the total pressure drop across the system 10 changes to $\Delta P_{total,\ new}$).

The valve 95 includes an actuator 97 that enables modulation of the orifice 96 between the first, open position and the second, restricted position.

With continued reference to FIG. 1, the actuator 97 includes a direct pneumatic control feedback line 98. The feedback line 98 communicates with compressed air passing out of the control assembly 90 and into the customer service line 14, and acts as a sensor that measures pressure changes and/or pressure change rates in the customer service line 14. Based on the measured data, the feedback line 98 actuates (or does not actuate) the valve 95. Thus, the construction illustrated in FIG. 1 includes a fully mechanical control assembly 90.

Figure 2:
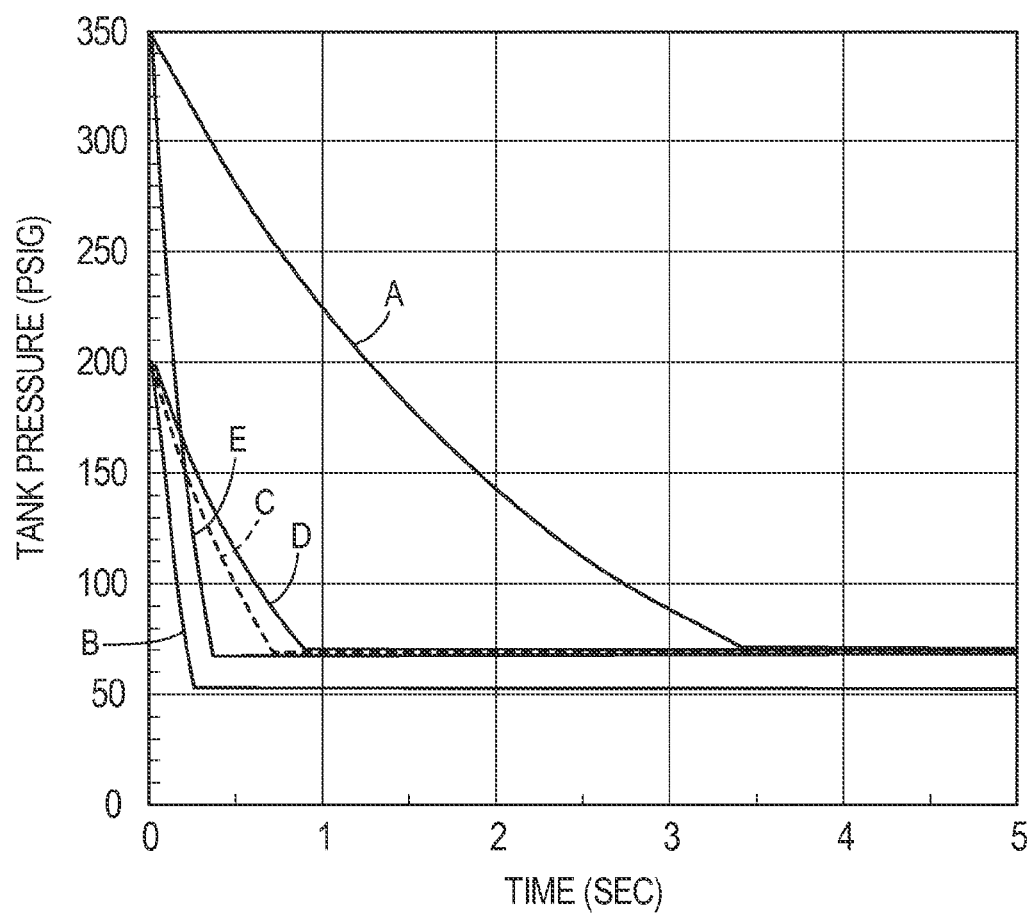
FIG. 2 is a chart illustrating an example of a discharge rate of the system.
Figure 3:
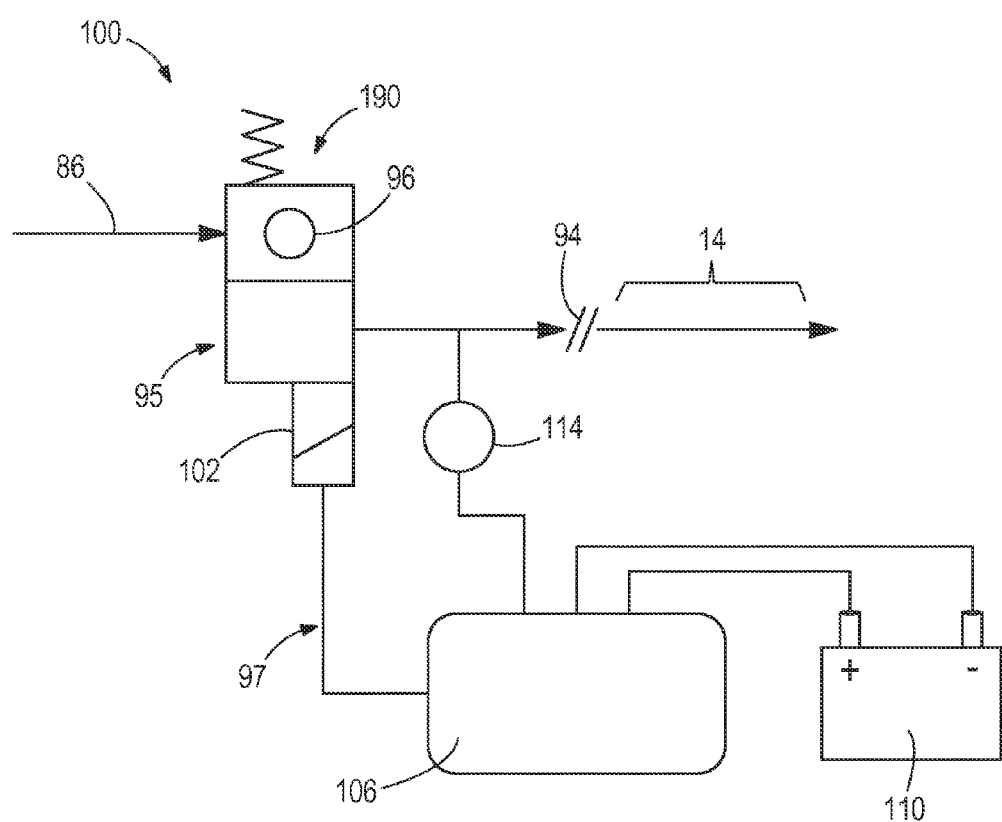
FIG. 3 is a schematic illustration of an air compressor discharge system according to another construction.

As illustrated in FIG. 2, the control assembly 90 serves to decrease a discharge rate of the system 10, better enabling the air compressor to keep up with "demand," thus minimizing the occurrence of voids upstream of the control assembly 90, and protecting component integrity in the process by limiting the pressure differentials to which the components (e.g., the separator element 42) are subjected. For example, FIG. 2 illustrates tank pressure (referring to the separator tank 38) and an amount of time to discharge that pressure with a control assembly 90 having a 0.875 inch diameter orifice 96 (referenced by line "A"), a control assembly 90 with no orifice 96 (referenced by line "B"), and a control assembly 90 with a 1 inch diameter orifice 96 (referenced by line "C"). FIG. 3 also illustrates tank pressure and an amount of time to discharge that pressure with a different control assembly 90 having a 30 mm diameter orifice 96 (referenced by line "D") and no orifice 96 (referenced by label "E"). As illustrated by FIG. 2, activating an orifice to restrict (e.g. to 0.875 inches as in line A) effectively decreases and slows the discharge rate of the system 10, thereby protecting upstream components.

FIG. 3 illustrates an air compressor discharge system 100 for generating and discharging airflow to the customer service line 14. The system 100 is identical to the system 10, with the exception of a control assembly 190. The control assembly 190 is identical to the control assembly 90, with the exception that the control feedback line 98 is replaced by an electric solenoid 102, electronic control module 106, power source 110 (e.g., a battery), and pressure transducer 114.

With reference to FIG. 3, the electric solenoid 102 is a two-position or proportional valve. The electronic control module 106 includes embedded software logic, and is coupled to both the electric solenoid 102 and the power source 110. The pressure transducer 114 is a sensor coupled to the electronic control module 106. The pressure transducer 114 communicates with compressed air passing out of the control assembly 90 and into the customer service line 14, and measures pressure changes and/or pressure change rates in the customer service line 14. The measured data is sent to the electronic control module 106, which then sends a signal to the electric solenoid 102 to change the position of the orifice 96 to either an open position or a restricted position.

With reference to FIGS. 1 and 3, in some constructions the control assembly 90, 190 provides more than two positions for the orifice 96. For example, in some constructions the control assembly 90 provides a first, open position, a second, restricted position, and a third, further restricted position. In some constructions the control assembly 90 provides for an infinite number of positions of the orifice 96.

For example, the control assembly 90 may include a proportionally controlled actuator 97 as opposed to only a two-position actuator 97, that positions the orifice 96 at any position between the open position and the partially restricted position.

With continued reference to FIGS. 1 and 3, the control assembly 90, 190 maintains the orifice 96 in the first, open position unless a pressure is reached and measured in the customer service line 14 that is below the threshold pressure or that indicates that the customer service line 14 has experienced a discharge rate that exceeds the rate of supply air from the air compressor 18. Maintaining the orifice 96 in the open position minimizes any pumping losses and input power requirements for the air compressor 18.

With continued reference to FIGS. 1 and 3, if the pressure in the customer service line 14 drops below the threshold pressure for a predetermined length of time or the service line 14 experiences a discharge rate that exceeds the supply air rate from the air compressor 18, the valve 95 in the control assembly 90, 190 shifts the operating position of the orifice 96 from the first, open position to the second, restricted position to increase the new component pressure drop $\Delta P_{component,\ new}$ across the control assembly 90, 190 and correspondingly decrease the rate at which air is evacuated from the system upstream of the control assembly 90, 190. As a result, the new component pressure drops $\Delta P_{component,\ new}$ across sensitive components such as the separator element 42 are lower than would otherwise exist if the orifice 96 in the control assembly 90, 190 remained in the first, open position after the customer service line 14 experienced a discharge rate that exceeded the rate of supply air from the air compressor 18 or the pressure in the customer service line dropped below the threshold pressure. This ensures that the control assembly 90, 190, as opposed to the other components (e.g., the separator element 42), absorbs a significant portion of the of the new total pressure drop $\Delta P_{total,\ new}$ generated when the customer service line 14 experiences a discharge rate that exceeds the rate of supply air from the air compressor 18 or the pressure in the customer service line 14 drops below the threshold pressure.

The equation below illustrates the difference in the pressure drop across a sensitive component like the separator element 42 when the control assembly 90, 190 is in the first, open position as opposed to the second, restricted position after the customer service line 14 experiences a discharge rate that exceeds the rate of supply air from the air compressor 18 or the pressure in the customer service line 14 drops below the threshold pressure. In the equation below $\Delta P_{component\ new,\ second}$ is the pressure drop across the separator element 42 when the customer service line 14 experiences a discharge rate that exceeds the rate of supply air from the air compressor 18 or the pressure in the customer service line 14 has dropped below the threshold pressure and the orifice 96 is in the second, restricted position. The $(velocity)_{second\ position}$ is the velocity of the compressed air in the control assembly 90 when the customer service line 14 experiences a discharge rate that exceeds the rate of supply air from the air compressor 18 or the pressure in the customer service line 14 has dropped below the threshold pressure and the orifice 96 is in the second, restricted position. The $(velocity)_{first\ position}$ is the velocity of the compressed air in the control assembly 90 when the customer service line 14 experiences a discharge rate that exceeds the rate of supply air from the air compressor 18 or the pressure in the customer service line 14 has dropped below the threshold pressure and the orifice 96 is still in the first, open position. The $\Delta P_{component\ new,\ first\ position}$ is the pressure drop across the separator element 42 when the customer service line 14 experiences a discharge rate that exceeds the rate of supply air from the air compressor 18 or the pressure in the customer in the service line 14 has dropped below the threshold pressure and the orifice 96 is still in the first, open position.

$$\Delta P_{component\ new,\ second\ position} = [(velocity)_{second\ position} / (velocity)_{first\ position}]^2 * \Delta P_{component\ new,\ first\ position}$$

As the equation above illustrates, the pressure drop in the first, open position is reduced by a square of the velocity reduction when the control assembly 90, 190 switches from the first, open position to the second, restricted position. This reduction in the pressure drop across the separator component 42 inhibits or prevents the separator element 42 (or other sensitive elements) from being damaged.

During periods when there are no sudden pressure drops in the customer service line 14, the systems 10, 100 minimize pumping losses and input power requirements by returning the control assemblies 90, 190 back to the first, open position.

Various features and advantages of the invention are set forth in the following claims.

I claim:

1. A compressor discharge system, operable to control a flow of compressed air to a load attached to a service line at a system pressure, the system comprising:
   a compressor operable to produce a flow of compressed air at a discharge pressure at a supply rate;
   a filter positioned downstream of the compressor and operable to receive the flow of compressed air at about the discharge pressure and discharge the flow of compressed air at a filter pressure; and
   a control assembly including a variable sized orifice movable between a normally open position and a restricted position wherein the restricted position allows a reduced flow of air through the orifice as compared to the normally open position, the variable orifice positioned to receive the flow of compressed air at about the filter pressure and to discharge the flow of compressed air at the system pressure, the control assembly being operable to detect whether the service line is experiencing a discharge rate that exceeds the supply rate from the compressor by detecting a predetermined pressure drop in the service line and in response, the control assembly being operable to move the orifice to the restricted position, such that in the restricted position, the discharge rate is reduced to reduce a pressure drop across the discharge system and allow continued operation of the air compressor to keep up with demand from the attached load.

2. The system of claim 1, wherein the service line is downstream of the control assembly, and wherein the system pressure is a pressure in the service line.

3. The system of claim 1, wherein the control assembly includes a spring-loaded, two-position, spool-type valve operable to control the size of the orifice.

4. The system of claim 1, wherein the control assembly includes a direct pneumatic control feedback line.

5. The system of claim 1, wherein the control assembly includes an electric solenoid.

6. The system of claim 5, wherein the control assembly includes an electronic control module with embedded software logic, the electronic control module coupled to the electric solenoid.

7. The system of claim 6, wherein the control assembly includes a pressure transducer coupled to the electronic control module.

8. The system of claim 1, wherein the control assembly includes a proportionally-controlled actuator.

9. The system of claim 1, wherein the orifice is sized and configured to increase a pressure drop across the control assembly when the orifice is moved to the restricted position.

10. The system of claim 1, wherein the orifice is sized and configured to decrease a pressure drop across the filter when the orifice is moved to the restricted position.

\* \* \* \* \*